United States Patent [19]

Lawler et al.

[11] 3,923,314

[45] Dec. 2, 1975

[54] NON-RIGID SEAL FOR JOINING SILICON CARBIDE TUBES AND TUBE SHEETS IN HEAT EXCHANGERS

[75] Inventors: Harry A. Lawler, Youngstown, N.Y.; John Reys, Solon, Ohio

[73] Assignee: The Carborundum Company, Niagara Falls, N.Y.

[22] Filed: Dec. 6, 1973

[21] Appl. No.: 422,441

[52] U.S. Cl. ............ 277/112; 277/DIG. 6; 165/135; 423/345
[51] Int. Cl. .......................... F16l 37/00; F16l 41/00
[58] Field of Search .......... 277/102, 110, 111, 112, 277/DIG. 6; 423/345; 165/135, 180, 173

[56] References Cited
UNITED STATES PATENTS

| | | | |
|---|---|---|---|
| 3,205,043 | 9/1965 | Taylor | 423/345 |
| 3,430,990 | 3/1969 | Nelson | 277/112 |
| 3,540,529 | 11/1970 | Umino | 165/173 |

*Primary Examiner*—Robert I. Smith
*Attorney, Agent, or Firm*—D. E. Dougherty; H. W. Mylius; R. W. Green

[57] ABSTRACT

An impermeable non-rigid seal is made between the joints of silicon carbide heat exchanger tubes and their supporting silicon carbide tube sheets by first making suitable openings for the tubes through the tube sheet before it is fired. Concentric with the small tube opening is a somewhat larger countersunk second opening, the bottom of the countersink forming a shoulder for the retention of packing material. A third countersink is made, larger than the second, to form a recess in which a graphite plug may be bonded. The tube sheet is infiltrated with silicon in a high temperature furnace and the graphite plug drilled and threaded to engage corresponding threads on a cylindrical packing follower. A silicon carbide tube is inserted in the tube sheet and packing material placed around it. The packing is enclosed by sliding the packing follower over the end of the tube and engaging it with the threaded graphite plug. Rotating the follower then compresses the packing to make an impermeable non-rigid seal between the tube and tube sheet.

5 Claims, 9 Drawing Figures

NON-RIGID SEAL FOR JOINING SILICON CARBIDE TUBES AND TUBE SHEETS IN HEAT EXCHANGERS

BACKGROUND OF THE INVENTION

Since the discovery of silicon carbide, its outstanding chemical and heat resistance have made it a preferred material for use in applications where elevated temperatures and chemical corrosion have limited other types of materials. An industrial application of great importance occurs in the use of silicon carbide in heat exchangers. Silicon carbide is well suited for this purpose since it can be used at temperatures as high as 2500°–2600°F, and has a relatively high thermal conductivity, as compared to other refractory materials, such as fire clay, glass, silica, and the like. Silicon carbide retains considerable strength at high temperatures and shows a high resistance to spalling, flame abrasion and chemical attack from combustion products as well. The high temperature capability, high thermal conductivity and corrosion resistance have therefore made silicon carbide particularly attractive for heat exchanger applications. The most serious problems here, however, have been the brittleness and hardness of the carbide; these cause great difficulty in making and maintaining adequate seals between the component parts of a silicon carbide exchanger. Although heat exchangers using silicon carbide tube sheets have been made, they have not in the past been entirely satisfactory. In these exchangers, the tubes have been joined to the tube sheets by refractory cements which formed a rigid bond. A tube could be replaced only by drilling out the cement, a costly and time consuming procedure. The rigid cemented joints were also subject to breakage by mechanical stresses set up during unequal expansion of the exchanger components during operation. The fact that silicon carbide tubes and tube sheets in a shell and tube type heat exchanger could not be economically joined to provide a non-rigid impermeable, corrosion resistant, high temperature seal has greatly restricted the use of silicon carbide for this purpose. The requirement that the joints be readily unsealed and disassembled, so that a single tube within an assembly could be replaced, was also unobtainable. Since there is an ever increasing need for heat transfer equipment that can handle chemically active fluids at elevated temperatures, a method for joining silicon carbide components to give leak tight assemblies in this type of equipment is therefore highly desirable. The joint should be easily constructed without using special equipment and should allow relatively easy assembly and disassembly without mechanical shock or damage to the component parts of the equipment.

SUMMARY OF THE INVENTION

The present invention pertains to forming an impermeable seal between a silicon carbide tube and a silicon carbide tube sheet in a heat exchanger, the tube being inserted into a suitable opening in the tube sheet and sealed by means of a suitable packing material placed around the tube and held in compression by a packing follower of chemical and heat resistant material, such as graphite, carbon polytetraflouroethylene, aromatic polyester or other suitable high strength temperature resistant resins. The packing follower is threaded within an annular plug of graphite or carbon which is in turn bonded within the silicon carbide tube sheet. This type of seal allows a limited degree of movement for the tube within the tube sheet, and permits easy replacement of a damaged tube without affecting adjacent tubes in the exchanger.

DETAILED DESCRIPTION OF THE PREFERRED EMBODIMENTS

Figure 1:
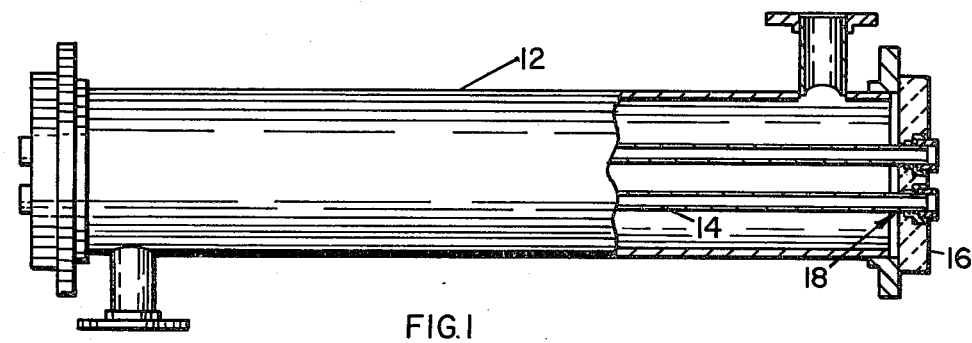
FIG. 1 is a side view of a heat exchanger, partially in section, showing the sealing joint of the invention in relationship to the exchanger tube sheet.
Figure 2:
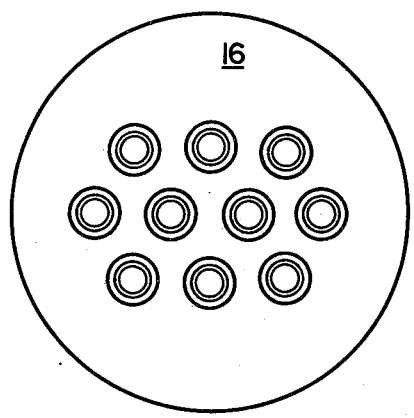
FIG. 2 shows an end view of the tube sheet of FIG. 1.

A typical shell and tube heat exchanger, using the sealing joints of the invention, is shown in partial section in FIG. 1. The shell, 12, of the exchanger is of standard construction and metallic composition and is arranged with inlet and outlet pipes to circulate either a heating or cooling fluid, as desired, around the internal tubes 14. The shell, 12 is closed at the ends by tube sheets, one of which is shown at 16. The tube sheets contain the necessary openings to support one or more of the tubes 14, an end view of a typical tube sheet assembly being shown in FIG. 2. For processing hot corrosive fluids, the tubes and tube sheets are made of silicon carbide, using for example methods such as those described by Taylor, U.S. Pat. No. 3,205,043, issued Sept. 7, 1965. For satisfactory operation, leaktight sealing of the joints, generally indicated at 18, between the tubes and the tube sheet is essential.

Figure 3:
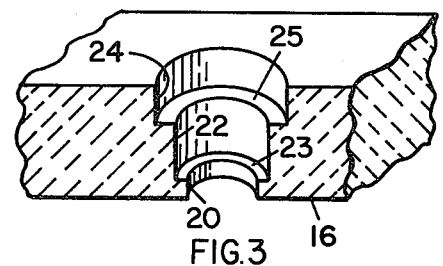
FIG. 3 shows an enlarged side view of the sealing joint openings in the tube sheet.

To construct the sealing joint of the invention, at least one circular opening, 20, is made in the silicon carbide tube sheet 16, as shown in FIG. 3. This opening has walls essentially perpendicular to the tube sheet surfaces and has a diameter large enough to permit the insertion of a silicon carbide tube through the opening when the joint is assembled. After the circular opening is made, a circular countersink is made in the external surface of the tube sheet, the countersink being coaxial with the first opening but not extending through the tube sheet. The countersink has a diameter substantially greater than that of the first opening, providing a side wall 22 and shoulder 23, these defining a chamber large enough to contain packing material which will surround the tube when the joint is assembled. After the circular countersink, a second countersink is made, also coaxially with the circular opening and circular countersink. The second countersink has a circumference substantially larger than that of the first circular countersink and is made in the same manner, providing a side wall 24 and lip 25. The opening and countersinks are made while the silicon carbide in the tube sheet is in a relatively soft state and can be easily shaped. While the formation of the opening and countersunk surfaces therein have been described as separate steps, these may also be formed with a suitable tool in one operation. The openings may be drilled in the tube sheet or may be formed by molding, if desired.

Figure 4:
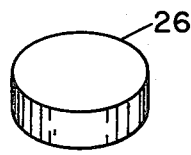
FIG. 4 shows an isometric view of a graphite plug insert, prior to being installed in the tube sheet.
Figure 5:
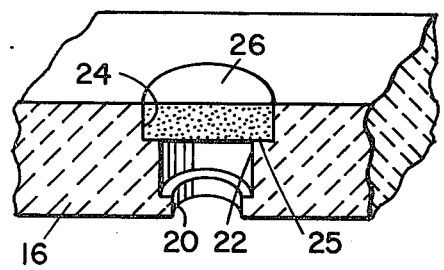
FIG. 5 shows the graphite plug installed in the tube sheet.
Figure 6:
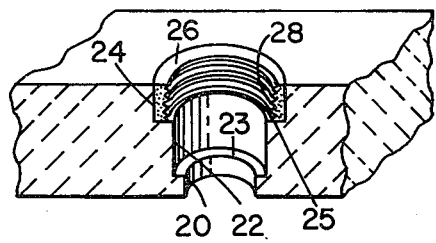
FIG. 6 shows the plug after drilling and machining.
Figure 7:
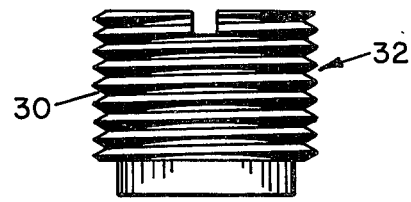
FIG. 7 is an isometric view of the packing follower.

After the openings have been formed, a tightly fitting annular plug 26 of carbonaceous material, such as graphite or carbon (see FIG. 4) is pressed into contact with side wall 24 and lip 25, and cemented in place with a resin-graphite cement. The cement is then cured and the silicon carbide tube sheet 16 is siliconized in a high temperature furnace. During this operation the tube sheet attains its full strength and hardness, and the plug 26 is also siliconized in place in the tube sheet, thus becoming firmly bonded within the tube sheet. The tube sheet 16, after the siliconizing treatment, is shown in FIG. 5, the carbonaceous plug 26 being firmly bonded and sealed to sheet 16 at the surfaces 24 and 25. Siliconizing of plug 26 may be restricted to surfaces 24 and 25 by coating the center surfaces of the plug with aluminum nitride powder. The plug 26 is then drilled and threaded at 28, forming a threaded ring as shown in FIG. 6, to engage corresponding threads 30 on a tubular packing follower, shown generally as 32 in FIG. 7. The follower has an internal opening sufficient to allow a sliding fit around the outer diameter of the silicon carbide tube inserted in the joint. The follower is made of a suitable heat and chemically resistant material, preferably graphite or carbon. Chemically resistant plastic materials such as aromatic polyesters and polycarbonates or fluorocarbons such as polytetrafluoroethylene may also be used for the follower material.

While the plug 26 is preferably of circular shape, it is not restricted to this configuration but may be made in other shapes such as oval, square, rectangular or the like, the side wall 24 and lip 25 of the second countersink being formed to give a corresponding enclosure. Although graphite or carbon are preferred as materials of construction, chemically resistant materials such as aromatic polyesters, polycarbonates or fluorocarbons such as polytetrafluoroethylene may also be used and the plug 26 may be bonded within the tube sheet after the sheet is siliconized. Whatever shape of plug is employed, it is of course drilled and threaded to give a threaded opening in axial alignment with the circular countersink 22 and circular opening 20 in tube sheet 16.

Figure 9:
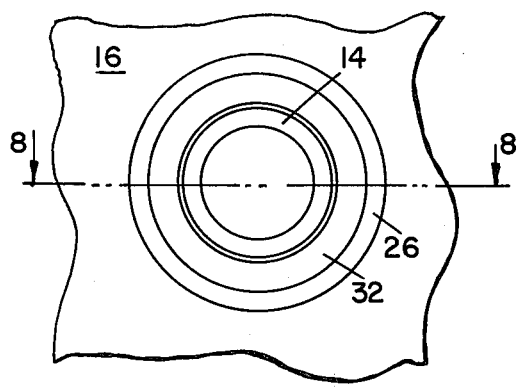
FIG. 9 shows a top view of the joint of FIG. 8.
Figure 8:
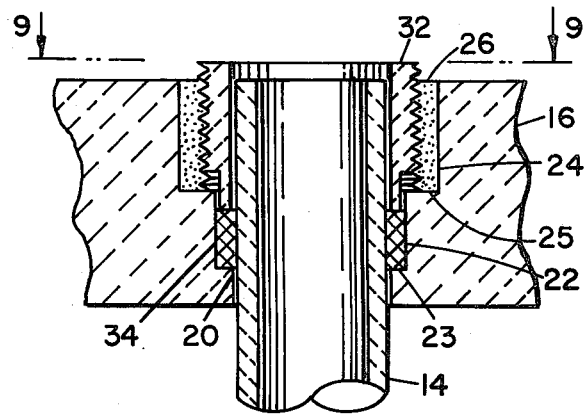
FIG. 8 is an enlarged sectional side view of the assembled sealing joint.

A detailed sectional side view of the assembled sealing joint is shown in FIG. 8 while a top view is shown in FIG. 9. The silicon carbide tube 14 is first inserted into the tube sheet 16 through the opening 20 and a suitable packing material 34 is placed around the tube.

The packing material may comprise flexible forms of heat and chemical resistant materials such as graphite or carbon yarn. Yarns of ceramic fibers may also be used if greater heat resistance is required. Flexible forms of polymeric materials such as polyamides, polyurethanes, natural or synthetic rubbers and fluoronated elastomers such as polytetrafluoroethylene may be used in applications where chemical resistance is the major requirement. The packing follower 32 is then placed over the end of the tube 14 and rotated in engagment with the threads on the ring 26, the follower compressing the packing 34 to form a leak tight seal around the tube 14. It should be noted that this is not a rigid seal, but is flexible enough to permit a small amount of movement in the tube, allowing compensation for the movement of tube sheet and tubes relative to each other due to differential rates of thermal expansion. The sealing joint of the invention is readily assembled and disassembled, allowing quick repairs to an individual tube without disturbing those adjoining it. Maintenance is simplified since a broken tube can be replaced, or a leaking joint repaired, by simple unscrewing the packing follower and replacing the tube or the packing material.

As a working example, a shell and tube heat exchanger has been made, utilizing the materials and methods taught herein. A side view of the exchanger, is shown, partially in section, in FIG. 1, with an end view of the exchanger tube sheet shown in FIG. 2. The tube sheet 16 is a circular piece of silicon carbide, 1½ inch thick and having an outside diameter of 10½ inches. The tube sheets support 10 silicon carbide tubes 14, these tubes being 4 feet in length, each tube having an outside diameter of one inch with an inside diameter of three-fourths inch. The tubes are held in the tube sheets by the seals of the invention, generally indicated at 18. For this application, the packing material 34 is braided polytetrafluoroethylene, held under compression by graphite packing followers 32. (See FIG. 8 for tube joint detail). The exchanger has a steel shell 12 with suitable inlet and outlet connections as shown for the flow of a suitable heat transfer liquid, such as a high boiling oil or chlorinated diphenyl, surrounding the tubes 14. This exchanger is designed for the heating of an aqueous, highly corrosive, acid stream flowing within the silicon carbide tubes, the heat transfer liquid being at a temperature ranging from 400° to 450°F. The pressure differential between this liquid and the acid inside the tubes is about 10 p.s.i., this differential being easily contained by the seals of the invention.

We claim:

1. An impermeable non-rigid seal in a heat exchanger; said seal comprising:
    a. a silicon carbide tube sheet having an inner surface and an outer surface, said sheet having at least one first circular opening therethrough, said opening having walls essentially perpendicular to said surfaces, and a silicon carbide tube inserted into said opening;
    b. said silicon carbide tube sheet having a second circular opening countersunk in said outer surface, said second opening being axially concentric with said first opening and having a diameter substantially greater than that of said first opening, the sides and bottom of said second opening defining a first chamber;
    c. a packing material located in said first chamber and positioned around said tube;
    d. said silicon carbide tube sheet having a third opening countersunk in said outer surface, said third opening being axially concentric with said first and second openings and having a circumference substantially greater than that of said second opening, the walls and bottom of said third opening defining a second chamber;
    e. a packing compression means encircling said tube, said means comprising a ring of machinable material bonded to and supported by the walls and bottom of said second chamber, said ring having the opening therein axially concentric with and having a substantially larger diameter than said tube, said ring opening having a thread machined therein; and f. a cylindrical packing follower encircling said tube, said follower having an external thread machined thereon for engagement with the thread machined in said ring opening for compression of said packing material around said tube upon rotation of said follower.

2. A seal according to claim 1 in which said ring and said packing follower comprise heat resistant materials selected from the group consisting of carbon and graphite.

3. A seal according to claim 1 in which said packing material comprises heat resistant materials selected from the group consisting of flexible forms of carbon, graphite, and ceramic yarns.

4. A seal according to claim 1 in which said ring and said packing follower comprises chemical resistant materials selected from the group consisting of polytetrafluorethylene, polycarbonates and aromatic polyesters.

5. A seal according to claim 1 in which said packing material comprises chemical resistant materials selected from the group consisting of flexible forms of natural and synthetic rubbers, polytetrafluorethylene, polyamides and polyurethanes.

* * * * *